J. S. LINGARD.
STEERING ROLLER FOR TRACTORS.
APPLICATION FILED OCT. 8, 1919.
1,376,286.
Patented Apr. 26, 1921.
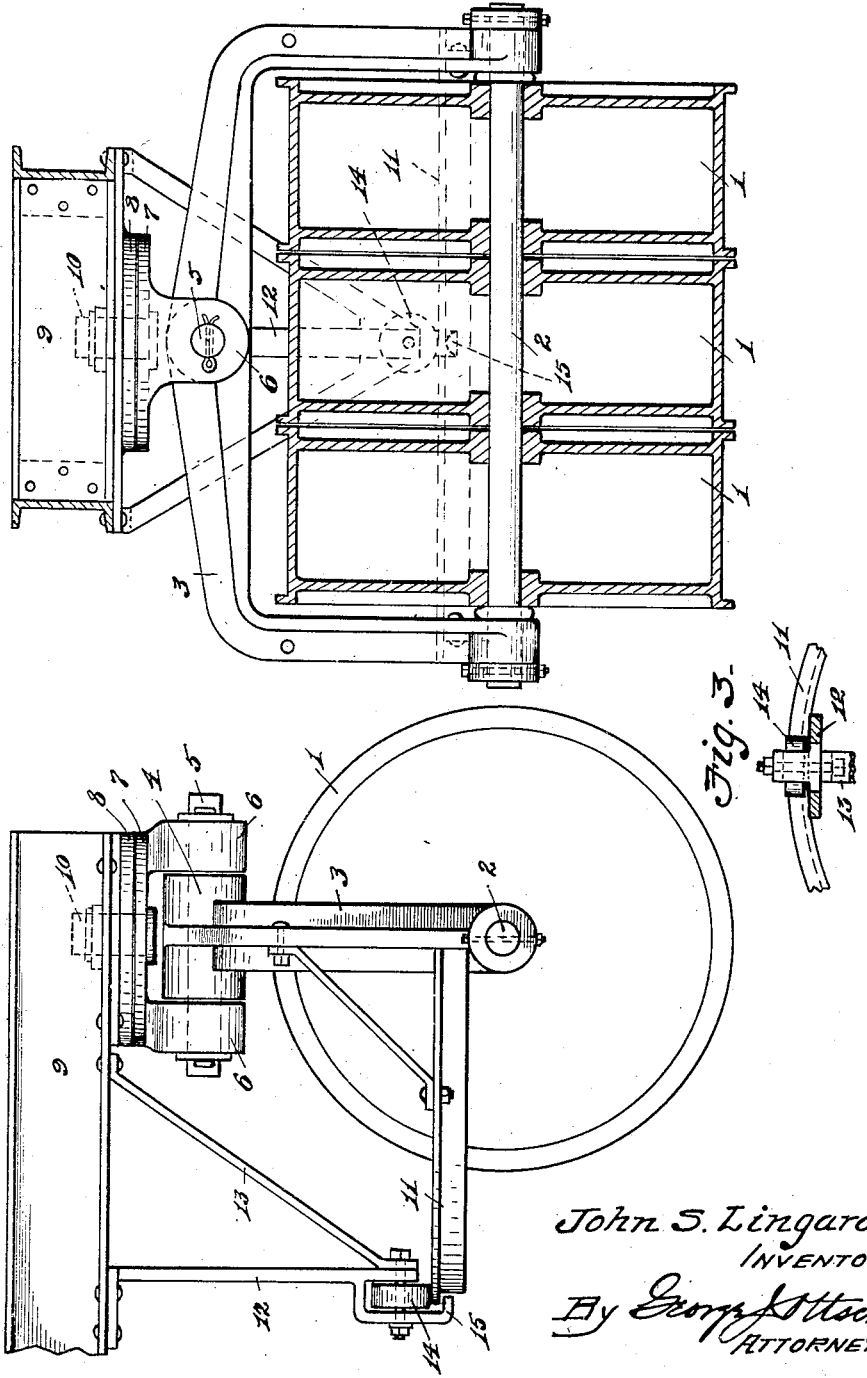
John S. Lingard
INVENTOR

UNITED STATES PATENT OFFICE.

JOHN S. LINGARD, OF LAPORTE, INDIANA.

STEERING-ROLLER FOR TRACTORS.

1,376,286.   Specification of Letters Patent.   Patented Apr. 26, 1921.

Application filed October 8, 1919. Serial No. 329,281.

*To all whom it may concern:*

Be it known that I, JOHN S. LINGARD, a citizen of the United States, residing at Laporte, in the county of Laporte and State of Indiana, have invented certain new and useful Improvements in Steering-Rollers for Tractors, of which the following is a specification.

This invention relates to an improvement in steering rollers for tractors and the like, wherein a steering roller of particular form is so mounted as to facilitate the steering operation, while permitting the roller to adjust itself to irregularities in the ground surface and guarding it against rearward thrust movement.

The improved roller is constructed of several independent sections, rotatively supported in a yoke, which is pivotally mounted in one member of a turntable. The yoke is provided with a rearwardly-extending thrust bar, constructed as a trackway for movement against a thrust roller, to thereby prevent movement of the roller under a rearwardly-acting thrust strain.

In the drawings:—

Figure 1 is a view in side elevation, showing the improved roller and bearing supports therefor.

Fig. 2 is a front elevation of the same, the roller being in section.

Fig. 3 is a broken plan of the thrust roller in relation to the thrust bar.

The improved steering rollers, when constructed in accordance with the present invention, are made in sections, as 1, there being three such sections shown. These sections are identical, and each complete in itself, thus constituting a sectional roller, which through the capabilities of one section moving faster than another when necessary, materially facilitate the steering operation.

The steering roller, that is the sections making up the same, are mounted for independent rotation on a fixed axle 2, in turn supported in the arms of a yoke 3. The yoke centrally above the steering roller is provided with a sleeve section 4, extending at right angles to the axis of the roller 1, and this sleeve receives a pivot bolt 5, terminally mounted in the diametrically-opposed ears 6, depending from the lower plate 7 of a turn table. The coöperating or upper plate of the turn table, as 8, is fixed to the frame 9 of the tractor or other vehicle, the usual king-bolt 10 connecting the plates 7 and 8.

The steering roller is thus capable of a lateral swing through the mounting of the yoke, and will thus readily adapt itself to travel over plowed ground or any irregular surface without strain on the turntable connection, through which the actual steering movement is gained by suitable steering elements forming no part of this application.

In the travel of the steering roller over soft or irregular surfaces, there is a more or less constant rear thrust on such steering roller, with a consequent strain on the connections described. The present invention contemplates means to counteract this rear thrust, and to this end, provides the yoke arms, immediately above the steering roller axle, with a rearwardly-extending curved bar 11, here shown formed of angle iron. The upper surface of this thrust bar is flat, at direct right angles to the king-bolt, and throughout the limits of steering movement, has a curvature struck from such king-bolt as a center.

The frame 9 is provided with a depending rigid support 12, braced at 13, in the lower end of which support is rotatively mounted a thrust roller 14, designed to ride on the upper surface of the thrust bar. A portion of the frame support 12 is extended as a guard finger 15 below the track or upper surface of the thrust bar. The engagement of the thrust roller and thrust bar is in direct vertical plane with the pivot bolt 5, so that lateral play of the steering roller is free of interference through riding engagement of the thrust roller and thrust bar.

The steering roller is thus prevented from strain under rearward thrust, as the thrust roller and bar take care of such strain, and hence the steering roller described is particularly well adapted for use in plowed or soft ground or over unusual irregularities.

Having thus described the invention, what is claimed as new, is:—

1. The combination with a pivoted yoke of a tractor having a steering roller therein, of a rearward thrust resisting member for said yoke, said member comprising a segmentally shaped bar formed from angle iron and arching the rear of the roller and having its ends connected to the arms of the yoke on each side of the roller, one flange of said segmentally shaped bar being horizontally disposed, a bracket carried by the tractor frame and extending downwardly to a point adjacent the horizontal flange, a roller carried by said bracket and having a raceway on the upper surface of said flange and a finger carried by said bracket and extending inwardly under said horizontal flange and forming means for preventing downward movement of the horizontal flange.

2. The combination with a pivoted yoke of a tractor having a steering roller therein, of a thrust resisting device for said yoke, said thrust resisting device comprising a rearwardly extending segmentally shaped bar having its ends connected to the yoke arms and provided with a horizontally disposed flange, a bracket extending downwardly from the frame, a roller carried by the lower end of said bracket and vertically disposed and engaging the horizontal flange and a finger carried by the bracket and extending inwardly under the horizontal flange and spaced from the same, said finger forming means for preventing downward movement of the horizontal flange.

In testimony whereof I affix my signature.

JOHN S. LINGARD.